(12) United States Patent
Lu et al.

(10) Patent No.: US 12,523,860 B2
(45) Date of Patent: Jan. 13, 2026

(54) OPTICAL PACKAGE

(71) Applicant: Advanced Semiconductor Engineering, Inc., Kaohsiung (TW)

(72) Inventors: Mei-Ju Lu, Kaohsiung (TW); Chi-Han Chen, Kaohsiung (TW); Jr-Wei Lin, Kaohsiung (TW); Pei-Jung Yang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 356 days.

(21) Appl. No.: 18/127,622

(22) Filed: Mar. 28, 2023

(65) Prior Publication Data

US 2024/0329387 A1   Oct. 3, 2024

(51) Int. Cl.
*G02B 26/08* (2006.01)

(52) U.S. Cl.
CPC .................. *G02B 26/0816* (2013.01)

(58) Field of Classification Search
CPC ............ G02B 26/0816; G02B 26/264; G02B 17/008; G02B 17/06; G02B 17/08
USPC ...................................................... 359/223.1
See application file for complete search history.

(56) References Cited

U.S. PATENT DOCUMENTS

| 6,798,992 | B1* | 9/2004 | Bishop | G02B 6/359 |
| | | | | 385/20 |
| 10,009,107 | B2 | 6/2018 | Segura et al. | |
| 11,860,410 | B2 | 1/2024 | Shin et al. | |
| 2003/0086147 | A1* | 5/2003 | Bruns | G02B 6/359 |
| | | | | 359/291 |
| 2004/0136045 | A1* | 7/2004 | Tran | G02B 7/008 |
| | | | | 359/872 |
| 2005/0139940 | A1* | 6/2005 | Patel | B81C 1/00904 |
| | | | | 438/460 |
| 2010/0302618 | A1* | 12/2010 | Patel | G02B 26/0841 |
| | | | | 156/60 |
| 2011/0164845 | A1* | 7/2011 | Jenkins | G02B 6/3596 |
| | | | | 385/18 |
| 2012/0250137 | A1* | 10/2012 | Maxik | G02B 26/08 |
| | | | | 359/291 |
| 2020/0278532 | A1* | 9/2020 | Lee | G02B 26/0833 |

FOREIGN PATENT DOCUMENTS

CN           212572557 U      2/2021

OTHER PUBLICATIONS

U.S. Appl. No. 18/092,145, filed Dec. 30, 2022, Lin et al.
U.S. Appl. No. 18/893,748, filed Sep. 23, 2024, Chen et al.

* cited by examiner

*Primary Examiner* — William R Alexander
(74) *Attorney, Agent, or Firm* — FOLEY & LARDNER LLP

(57) ABSTRACT

An optical package is provided. The optical package includes a first optical device and an optical guiding structure. The first optical device is disposed over a carrier. The optical guiding structure is disposed over the carrier and configured to adjust a first optical transmission path of the first optical device.

16 Claims, 15 Drawing Sheets

OPTICAL PACKAGE

BACKGROUND

1. Technical Field

The present disclosure relates generally to an optical package.

2. Description of the Related Art

Silicon photonics and optical engines with integration of at least an electronic IC (EIC) and a photonic IC (PIC) have advantages of high transmission speed and low power loss and thus are applied in various areas. Such integrated device or package requires transmission of optical signals between PICs.

SUMMARY

In one or more arrangements, an optical package includes a first optical device and an optical guiding structure. The first optical device is disposed over a carrier. The optical guiding structure is disposed over the carrier and configured to adjust a first optical transmission path of the first optical device.

In one or more arrangements, an optical package includes a first optical device, a second optical device, and an optical reflective surface. The optical reflective surface is configured to transmit a first optical signal to the first optical device and a second optical signal to the second optical device.

In one or more arrangements, an optical package includes a first optical device and an optical guiding structure. The first optical device is exposed to an air space. The optical guiding structure is configured to adjust at least one optical path starting from the first optical device and passing through the air space.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
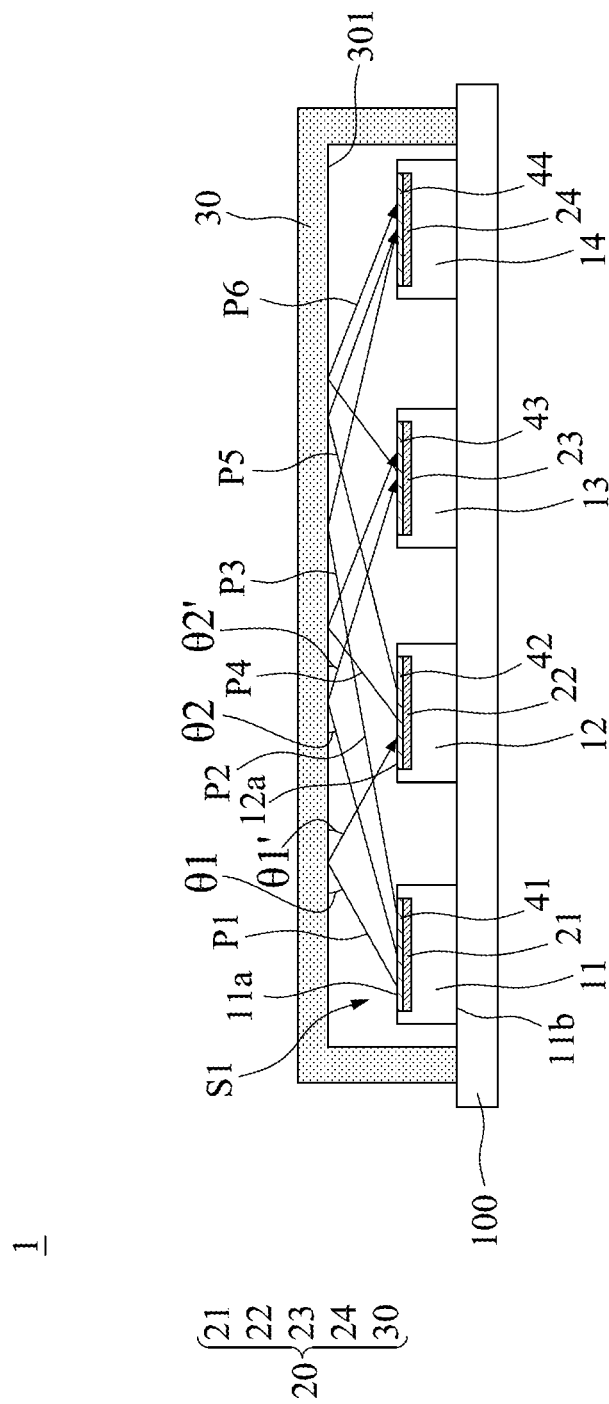
FIG. 1 is a cross-section of an optical package in accordance with some arrangements of the present disclosure.

FIG. 1 is a cross-section of an optical package 1 in accordance with some arrangements of the present disclosure. The optical package 1 may include a carrier 100, two or more optical devices (e.g., optical devices 11, 12, 13, and 14), and an optical guiding structure 20.

The carrier 100 may include, for example, a printed circuit board, such as a paper-based copper foil laminate, a composite copper foil laminate, or a polymer-impregnated glass-fiber-based copper foil laminate. The carrier 100 may include an interconnection structure, which may include such as a plurality of conductive traces and/or a plurality of conductive vias. The interconnection structure may include a redistribution layer (RDL) and/or a grounding element. In some arrangements, the carrier 100 includes a ceramic material or a metal plate. In some arrangements, the carrier 100 may include a substrate, such as an organic substrate or a leadframe. In some arrangements, the carrier 100 may include a two-layer substrate which includes a core layer and a conductive material and/or structure disposed on an upper surface and a bottom surface of the carrier 100. The conductive material and/or structure may include a plurality of conductive traces. The carrier 100 may include one or more conductive pads in proximity to, adjacent to, or embedded in and exposed at an upper surface and/or a bottom surface of the carrier 100. The carrier 100 may include a solder resist (not shown) on the upper surface and/or the bottom surface of the carrier 100 to fully expose or to expose at least a portion of the conductive pads for electrical connections. In some arrangements, the carrier 100 supports the optical devices 11, 12, 13, and 14 and the optical guiding structure 20.

The optical devices 11, 12, 13, and 14 may be disposed over the carrier 100. In some arrangements, the optical devices 11, 12, 13, and 14 are exposed to an air space S1. The optical devices 11, 12, 13, and 14 may be disposed on or attached to the carrier 100 through adhesive layers (not shown). The optical devices 11, 12, 13, and 14 may be electrically connected to the carrier 100 by way of flip-chip or wire-bond techniques. In some arrangements, each of the optical devices 11, 12, 13, and 14 may be or include an optical engine. In some arrangements, each of the optical devices 11, 12, 13, and 14 may include a photonic component (e.g., a photonic IC (PIC)) and an electronic component (e.g., an electronic IC (EIC).

In some arrangements, the optical device 11 is configured to transmit an optical signal through one or more optical transmission paths (e.g., path regions or paths P1, P2, and P3). In some arrangements, the optical device 11 is configured to emit or receive an optical signal through one or more optical transmission paths (e.g., path regions or paths P1, P2, and P3). In some arrangements, the optical device 11 is configured to transmit two or more optical signals through different optical transmission paths (e.g., path regions or paths P1, P2, and P3), and at least two or more of the optical signals transmitted through different optical transmission paths have different wavelengths. In some arrangements, the optical device 11 includes a lens element 41 disposed adjacent to an optical emitting surface 11a of the optical device 11. The lens element 41 may be configured to converge light beams into an output optical signal or diverge an input optical signal into light beams. The lens element 41 may include a lens or a plurality of lenses. In some arrangements, the optical device 11 is exposed to the air space S1, and portions of the air space S1 define the paths P1, P2, and P3 (or path regions).

In some arrangements, the optical device 12 is configured to transmit an optical signal through one or more optical transmission paths (e.g., path regions or paths P1, P4, and P5). In some arrangements, the optical device 12 is configured to emit or receive an optical signal through one or more optical transmission paths (e.g., path regions or paths P1, P4, and P5). In some arrangements, the optical device 12 is optically coupled with the optical device 11. In some arrangements, the optical device 12 is configured to optically couple with the optical device 11 through the path P1. In some arrangements, the optical device 12 is configured to transmit two or more optical signals through different optical transmission paths (e.g., path regions or paths P1, P4, and P5), and at least two or more of the optical signals transmitted through different optical transmission paths have different wavelengths. In some arrangements, the optical device 12 includes a lens element 42 disposed adjacent to an optical emitting surface 12a of the optical device 12. The lens element 42 may be configured to converge light beams into an output optical signal or diverge an input optical signal into light beams. For example, the lens element 42 may be configured to converge light beams into an output optical signal transmitted to the optical device 11, and the lens element 42 may be configured to diverge an input optical signal received from the optical device 11 into light beams. In some arrangements, the optical emitting surface 11a of the optical device 11 and the optical emitting surface 12a of the optical device 12 face a same side. In some arrangements, the optical device 12 is exposed to the air space S1, and portions of the air space S1 further define the paths P4 and P5 (or path regions).

In some arrangements, the optical device 13 is configured to transmit an optical signal through one or more optical transmission paths (e.g., path regions or paths P2, P4, and P6). In some arrangements, the optical device 13 is configured to emit or receive an optical signal through one or more optical transmission paths (e.g., path regions or paths P2, P4, and P6). In some arrangements, the optical device 13 is optically coupled with at least one of the optical device 11 and the optical device 12. In some arrangements, the optical device 13 is configured to optically couple with the optical device 11 through the path P2. In some arrangements, the optical device 13 is configured to optically couple with the optical device 12 through the path P4. In some arrangements, the optical device 13 is configured to transmit two or more optical signals through different optical transmission paths (e.g., path regions or paths P2, P4, and P6), and at least two or more of the optical signals transmitted through different optical transmission paths have different wavelengths. In some arrangements, the optical device 13 includes a lens element 43 disposed adjacent to an optical emitting surface 13a of the optical device 13. The lens element 43 may be configured to converge light beams into an output optical signal or diverge an input optical signal into light beams. In some arrangements, the optical emitting surface 12a of the optical device 12 and the optical emitting surface 13a of the optical device 13 face a same side. In some arrangements, the optical device 13 is exposed to the air space S1, and a portion of the air space S1 further defines the path P6 (or the path region).

In some arrangements, the optical device 14 is configured to transmit an optical signal through one or more optical transmission paths (e.g., path regions or paths P3, P5, and P6). In some arrangements, the optical device 14 is configured to emit or receive an optical signal through one or more optical transmission paths (e.g., path regions or paths P3, P5, and P6). In some arrangements, the optical device 14 is optically coupled with at least one of the optical device 11, the optical device 12, and the optical device 13. In some arrangements, the optical device 14 is configured to optically couple with the optical device 11 through the path P3. In some arrangements, the optical device 14 is configured to optically couple with the optical device 12 through the path P5. In some arrangements, the optical device 14 is configured to optically couple with the optical device 13 through the path P6. In some arrangements, the optical device 14 is configured to transmit two or more optical signals through different optical transmission paths (e.g., path regions or paths P3, P5, and P6), and at least two or more of the optical signals transmitted through different optical transmission paths have different wavelengths. In some arrangements, the optical device 14 includes a lens element 44 disposed adjacent to an optical emitting surface 14a of the optical device 14. The lens element 44 may be configured to converge light beams into an output optical signal or diverge an input optical signal into light beams. In some arrangements, the optical emitting surface 13a of the optical device 13 and optical emitting surface 14a of the optical device 14 face a same side.

The optical guiding structure 20 may be disposed over the carrier 100. In some arrangements, the optical guiding structure 20 is configured to adjust one or more optical transmission paths of one or more of the optical devices 11, 12, 13, and 14. In some arrangements, the optical guiding structure 20 is configured to adjust one or more transmitting directions of one or more optical signals through one or more optical transmission paths of one or more of the optical devices 11, 12, 13, and 14. In some arrangements, the optical guiding structure 20 is configured to adjust one or more emitting angles of one or more optical signals through one or more optical transmission paths of one or more of the optical devices 11, 12, 13, and 14. In some arrangements, the optical guiding structure 20 is configured to adjust an optical transmission path of one or more of the optical devices 11, 12, 13, and 14 between different path regions. In some arrangements, the optical guiding structure 20 is configured to adjust one or more optical coupling paths between at least two of the optical devices 11, 12, 13, and 14. In some arrangements, the optical guiding structure 20 is configured to adjust or alter the optical transmission path to optically couple at least two of the optical devices 11, 12, 13, and 14.

In some arrangements, the optical guiding structure 20 is configured to adjust an optical transmission path of the optical device 11. In some arrangements, the optical guiding structure 20 is configured to adjust a transmitting direction of an optical signal through the optical transmission path of the optical device 11. In some arrangements, the optical guiding structure 20 is configured to adjust an emitting angle of an optical signal through the optical transmission path of the optical device 11. In some arrangements, the optical guiding structure 20 is configured to adjust an optical transmission path of the optical device 11 between the paths P1, P2, and P3. In some arrangements, the optical guiding structure 20 is configured to adjust an optical coupling path between the optical device 11 and at least one of the optical devices 12, 13, and 14. In some arrangements, the optical guiding structure 20 is configured to adjust or alter the optical transmission path to optically couple the optical device 11 with the optical device 12, the optical device 13, or the optical device 14.

In some arrangements, the optical guiding structure 20 includes an optical guiding component 21 integrated in the optical device 11. In some arrangements, the optical guiding component 21 is integrated in an active layer (not shown in FIG. 1) of the optical device 11. The active layer may include one or more active elements/components. The active layer may include one or more circuit layers. In some arrangements, the lens element 41 is disposed over the optical guiding component 21. In some arrangements, the optical guiding component 21 is configured to change a phase of an optical signal transmitted through the optical transmission path of the optical device 11. In some arrangements, the optical guiding component 21 is configured to steer a direction of an optical signal input to or output from the optical device 11. In some arrangements, the optical guiding component 21 is configured to alter a propagation direction of an optical signal transmitted through the optical transmission path of the optical device 11.

In some arrangements, the optical guiding structure 20 is configured to optically couple the optical device 11 with at least two of the optical devices 12, 13, and 14 at different time intervals. In some arrangements, the optical guiding structure 20 is configured to optically couple the optical device 11 with the optical device 12 at a time interval T1 (also referred to as "a first time interval") and optically couple the optical device 11 with the optical device 13 at a time interval T2 (also referred to as "a second time interval") different from the time interval T1. The time interval T1 and the time interval T2 may be two different time periods that are partially overlapped or free from overlapping each other. The time intervals T1 and T2 may start at different time points and/or end at different time points. In some arrangements, the optical guiding structure 20 is configured to adjust the optical transmission path of the optical device 11 to the path P1 (or a first path region) at the time interval T1 and to the path P2 (or the second path region) at the time interval T2. In some arrangements, the optical guiding structure 20 is configured to adjust at least one optical path (e.g., the paths P1, P2, and P3) starting from the optical device 11 and passing through the air space S1. In some arrangements, the optical guiding structure 20 is further configured to optically couple the optical device 11 with the optical device 14 at a time interval T3 (also referred to as "a third time interval") different from the time intervals T1 and T2. The time interval T3 may be different from the time intervals T1 and T2 in a same or similar manner as described above, and the details are not repeated hereinafter.

In some arrangements, the optical guiding structure 20 is configured to adjust an optical transmission path of the optical device 12. In some arrangements, the optical guiding structure 20 is configured to adjust a transmitting direction of an optical signal through the optical transmission path of the optical device 12. In some arrangements, the optical guiding structure 20 is configured to adjust an optical transmission path of the optical device 12 between the paths P1, P4, and P5. In some arrangements, the optical guiding structure 20 is configured to adjust an optical coupling path between the optical device 12 and at least one of the optical devices 11, 13, and 14. In some arrangements, the optical guiding structure 20 is configured to adjust or alter the optical transmission path to optically couple the optical device 12 with the optical device 11, the optical device 13, or the optical device 14.

In some arrangements, the optical guiding structure 20 is configured to adjust an optical coupling path (also referred to as "a first optical coupling path") between the optical device 12 and the optical device 11 and an optical coupling path (also referred to as "a second optical coupling path") between the optical device 12 and the optical device 13, and the two optical coupling paths are different. In some arrangements, the optical guiding structure 20 is configured to adjust the first optical coupling path and the second optical coupling path at a same time interval. In some arrangements, the optical guiding structure 20 is configured to adjust two or more optical coupling paths to transmit optical signals having the same or different wavelengths through different optical coupling paths at a same time interval. For example, the optical guiding structure 20 may be configured to adjust the paths P1 and P2 to allow the optical device 11 to transmit optical signals having different wavelengths through the paths P1 and P2 at a same time interval. For example, the optical guiding structure 20 may be configured to adjust the paths P1 and P2 to allow the optical devices 12 and 13 to receive optical signals having different wavelengths at a same time interval.

In some arrangements, the optical guiding structure 20 further includes optical guiding components 22, 23 and 24 each integrated in a respective optical device (e.g., the optical devices 12, 13, and 14). In some arrangements, each of the optical guiding components 22, 23 and 24 is integrated in an active layer of the responding optical device. In some arrangements, each of the optical guiding components 22, 23 and 24 may possess functions performed on the corresponding optical device that are the same as or similar to those of the optical guiding component 21, and the details are not repeated hereinafter.

In some arrangements, the optical guiding structure 20 further includes a reflective structure 30 over the carrier 100. In some arrangements, the reflective structure 30 is over the optical emitting surfaces (e.g., surfaces 11a, 12a, 13a, and 14a). In some arrangements, the reflective structure 30 is configured to direct an optical signal from one of the optical devices 11, 12, 13, and 14 to another one of the optical devices 11, 12, 13, and 14 through an optical transmission path (e.g., at least one of the paths P1-P6). For example, the reflective structure 30 is configured to direct an optical signal from the optical device 11 to the optical device 12 through the path P1. In some arrangements, the reflective structure 30 is configured to alter a propagating direction of an optical signal transmitted through at least one optical coupling path (e.g., at least one of the paths P1-P6).

In some arrangements, the reflective structure 30 has a reflective surface 301 (also referred to as "an optical reflective surface"). In some arrangements, the reflective surface 301 is a substantially flat reflective surface facing one or more the optical emitting surfaces 11a, 12a, 13a, and 14a of the optical devices 11, 12, 13, and 14. In some arrangements, the reflective structure 30 and the carrier 100 collectively define the air space S1. In some arrangements, the reflective structure 30 is configured to reflect one or more optical signals transmitted through one or more optical transmission paths of the optical devices 11, 12, 13, and 14. In some arrangements, the reflective structure 30 is configured to reflect two or more different optical signals transmitted through two or more different optical transmission paths of the optical devices 11, 12, 13, and 14. In some arrangements, at least one of the optical devices 11, 12, 13, and 14 is configured to emit or receive at least one optical signal propagating along at least one optical path (e.g., at least one of the paths P1-P6) and encountering the reflective surface 301 of the reflective structure 30.

In some arrangements, the reflective surface 301 (or the optical reflective surface) is configured to transmit optical signals (also referred to as "a first optical signal and a second optical signal") to at least two optical devices (e.g., at least two of the optical devices 11, 12, 13, and 14). For example, the reflective surface 301 may be configured to transmit a first optical signal to the device 12 and a second optical signal to the device 13. In some arrangements, the reflective surface 301 is substantially parallel to one or more of the optical emitting surfaces 11a, 12a, 13a, and 14a of the optical devices 11, 12, 13, and 14. In some arrangements, the reflective surface 301 is configured to reflect optical signals toward different directions. In some arrangements, the reflective surface 301 is configured to alter a propagating direction of light (also referred to as "an optical propagating direction") to transmit the optical signals to two or more of the optical devices 11, 12, 13, and 14 through the air space S1. In some arrangements, the reflective surface 301 is configured to reflect optical signals toward different locations in the air space S1.

In some arrangements, the reflective surface 301 and at least one of the optical devices 11, 12, 13, and 14 are configured to collaboratively adjust an optical transmission angle (e.g., angles $\theta1$, $\theta2$, $\theta1'$, and $\theta2'$) with respect to the reflective surface 301. In some embodiments, the optical transmission angle (e.g., angles $\theta1$ and $\theta2$) is defined by the reflective surface 301 and an optical signal transmitted toward the reflective surface 301. In some embodiments, the optical transmission angle (e.g., angles $\theta1'$ and $\theta2'$) is defined by the reflective surface 301 and an optical signal reflected by the reflective surface 301. For example, the reflective surface 301 and the optical device 11 may be configured to collaboratively adjust an optical transmission angle between $\theta1$ and $\theta2$ so as to transmit an optical signal to the optical device 12 or the optical device 13. For example, the reflective surface 301 and the optical device 11 may be configured to collaboratively adjust an optical transmission angle between $\theta1'$ and $\theta2'$ so as to transmit an optical signal to the optical device 12 or the optical device 13. For example, the reflective surface 301 and the optical device 11 may be configured to collaboratively adjust an optical transmission angle between $\theta1$ and $\theta2$ so as to transmit an optical signal through the path P1 or the path P2. For example, the reflective surface 301 and the optical device 11 may be configured to collaboratively adjust an optical transmission angle between $\theta1'$ and $\theta2'$ so as to transmit an optical signal through the path P1 or the path P2. In some arrangements, the reflective surface 301 and the optical guiding component 21 integrated in the optical device 11 are configured to collaboratively adjust an optical transmission angle between $\theta1$ and $\theta2$ so as to transmit an optical signal to the optical device 12 or the optical device 13. In some arrangements, the angle $\theta1$ is substantially equal to the angle $\theta1'$. In some arrangements, the angle $\theta2$ is substantially equal to the angle $\theta2'$.

According to some arrangements of the present disclosure, with the design of the optical guiding structure, the transmission path of an optical signal may be adjusted according to actual applications rather than being restricted or confined within a predetermined solid structure (e.g., a polymer or semiconductor waveguide structure). Therefore, the flexibility of optical transmission is increased.

In addition, according to some arrangements of the present disclosure, with the design of the optical guiding structure, optical signals may be transmitted through optical paths in air rather than in a solid structure (e.g., a polymer or semiconductor waveguide structure). Therefore, various different transmission path structures (e.g., various waveguide structures) for transmitting different optical signals are not required, the overall volume of the package is reduced, the optical transmission structure is simplified, and the complexity of packaging is reduced.

Moreover, according to some arrangements of the present disclosure, with the design of the optical guiding structure, the optical transmission is through air. As such, multiple optical signals may be transmitted at various time intervals that are overlapping each other, complicated waveguide structures or additional switch elements for transmitting various optical signals at different time intervals are not required, and thus selectivity and flexibility of optical transmission can be significantly increased. For example, instead of complicated waveguide structures and/or additional switch elements, a reflective structure having a reflective surface combined with the optical guiding structure can be sufficient to provide the adjustment of the optical paths through air.

Figure 1A:
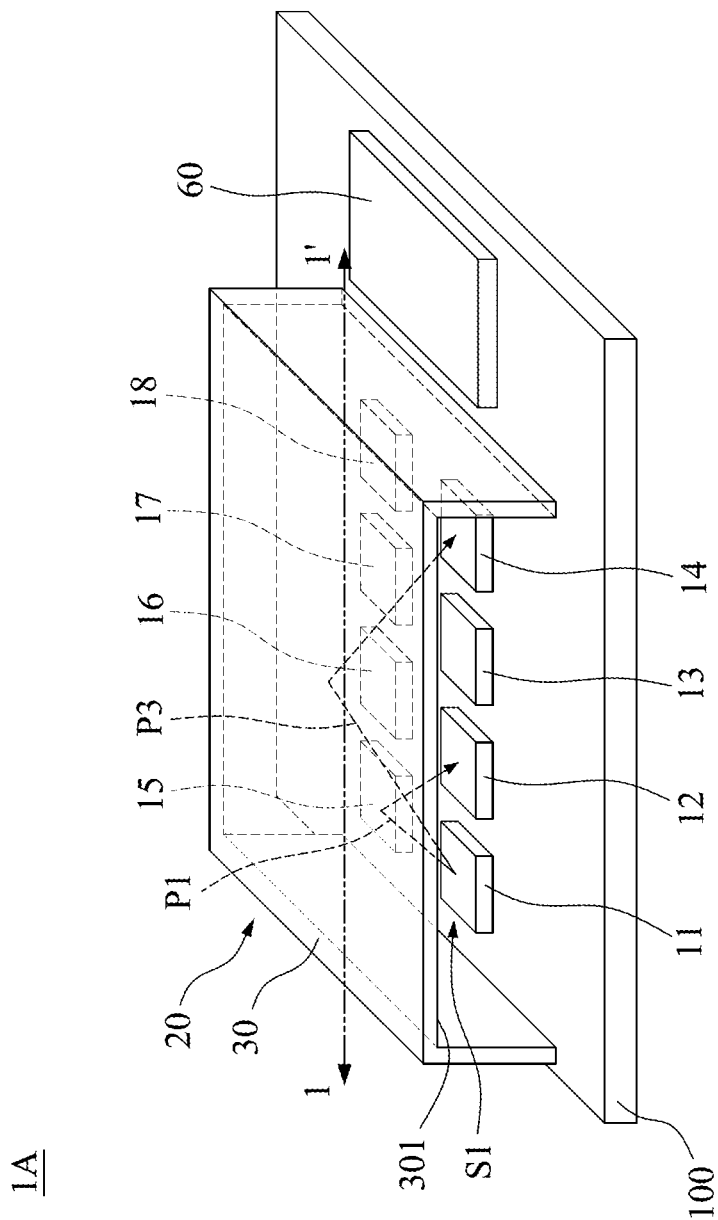
FIG. 1A is a perspective view of an optical package in accordance with some arrangements of the present disclosure.

FIG. 1A is a perspective view of an optical package 1A in accordance with some arrangements of the present disclosure. In some arrangements, FIG. 1 illustrates a cross-section along a line 1-1' in FIG. 1A. Please be noted that some components/elements are omitted in FIG. 1A for clarity.

In some arrangements, the optical package 1A further includes a processing component 60 and optical devices 15, 16, 17, and 18. The optical devices 15, 16, 17, and 18 and the processing component 60 may be disposed over the carrier 100. The processing component 60 may be electrically connected to one or more of the optical devices 11, 12, 13, 14, 15, 16, 17, and 18. The processing component 60 may include an ASIC, an FPGA, a GPU, or the like, or a combination thereof. In some arrangements, at least one of the optical devices 11, 12, 13, 14, 15, 16, 17, and 18 is configured to receive an electrical signal from the processing component 60, covert the electrical signal into an optical signal, and output the optical signal to another optical device that is configured to convert the received optical signal to an electrical signal to be received and processed by another processing component. In some arrangements, at least one of the optical devices 11, 12, 13, 14, 15, 16, 17, and 18 is configured to receive an optical signal, convert the optical signal to an electrical signal, and transmit the electrical signal to the processing component 60. In some arrangements, the at least one of the optical devices 11, 12, 13, 14, 15, 16, 17, and 18 is configured as an input/output (I/O) terminal or a port of the processing component 60.

In some arrangements, the reflective surface 301 covers the optical emitting surfaces of the optical devices 11, 12, 13, 14, 15, 16, 17, and 18 from a top view perspective. In some arrangements, the optical devices 11, 12, 13, 14, 15, 16, 17, and 18 are within a projection of the reflective surface 301 on the carrier 100. The air space S1 may be connected to external environment through openings of the reflective structure 30.

Figure 1B:
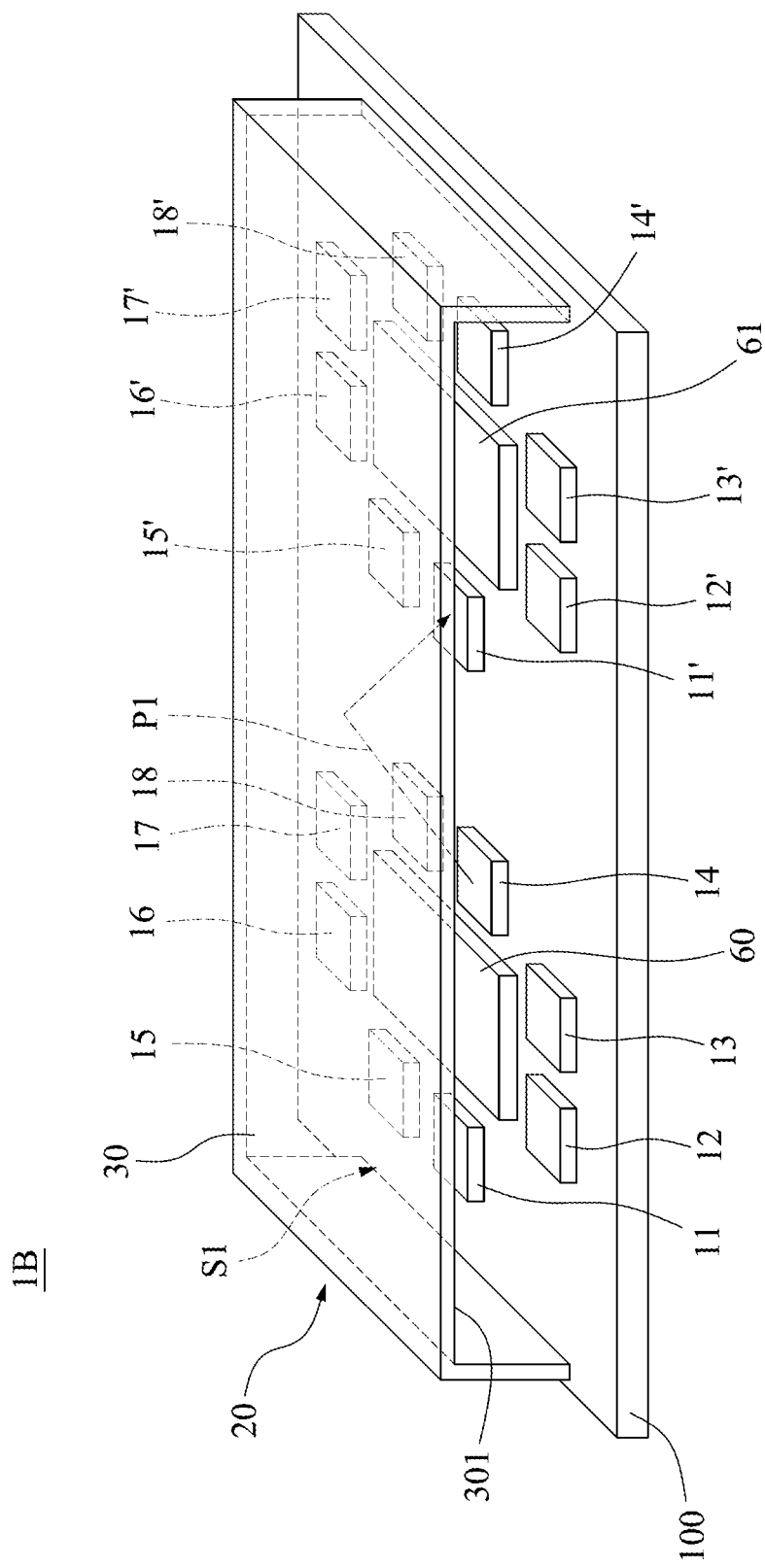
FIG. 1B is a perspective view of an optical package in accordance with some arrangements of the present disclosure.

FIG. 1B is a perspective view of an optical package 1B in accordance with some arrangements of the present disclosure. Please be noted that some components/elements are omitted in FIG. 1B for clarity. The optical package 1B is similar to the optical package 1A in FIG. 1A, and the differences therebetween are described as follows.

In some arrangements, the optical package 1B further includes a processing component 61 and optical devices 11', 12', 13', 14', 15', 16', 17', and 18'. The optical devices 11', 12', 13', 14', 15', 16', 17', and 18' and the processing component 61 may be disposed over the carrier 100. The processing component 60 may be electrically connected to one or more of the optical devices 11, 12, 13, 14, 15, 16, 17, and 18, and the processing component 61 may be electrically connected to one or more of the optical devices 11', 12', 13', 14', 15', 16', 17', and 18'. The processing component 61 may include an ASIC, an FPGA, a GPU, or the like, or a combination thereof.

In some arrangements, at least one of the optical devices 11', 12', 13', 14', 15', 16', 17', and 18' is configured to receive an electrical signal from the processing component 61, covert the electrical signal into an optical signal, and output the optical signal to another optical device that is configured to convert the received optical signal to an electrical signal to be received and processed by another processing component (e.g., the processing component 60). In some arrangements, at least one of the optical devices 11', 12', 13', 14', 15', 16', 17', and 18' is configured to receive an optical signal, convert the optical signal to an electrical signal, and transmit the electrical signal to the processing component 61. In some arrangements, the at least one of the optical devices 11', 12', 13', 14', 15', 16', 17', and 18' is configured as an I/O terminal or a port of the processing component 61. In some arrangements, the optical guiding structure 20 is configured to optically couple at least one of the optical devices 11, 12, 13, 14, 15, 16, 17, and 18 (e.g., the optical device 11) with at least one of the optical devices 11', 12', 13', 14', 15', 16', 17', and 18' (e.g., the optical device 11') through at least one optical path (e.g., the path P1).

In some arrangements, the processing components 60 and 61 are disposed in the air space S1. In some arrangements, the reflective surface 301 covers the optical emitting surfaces of the optical devices 11, 12, 13, 14, 15, 16, 17, 18, 19, 11', 12', 13', 14', 15', 16', 17', and 18' from a top view perspective. In some arrangements, the processing components 60 and 61 and the optical devices 11, 12, 13, 14, 15, 16, 17, 18, 19, 11', 12', 13', 14', 15', 16', 17', and 18' are within a projection of the reflective surface 301 on the carrier 100.

Figure 2A:
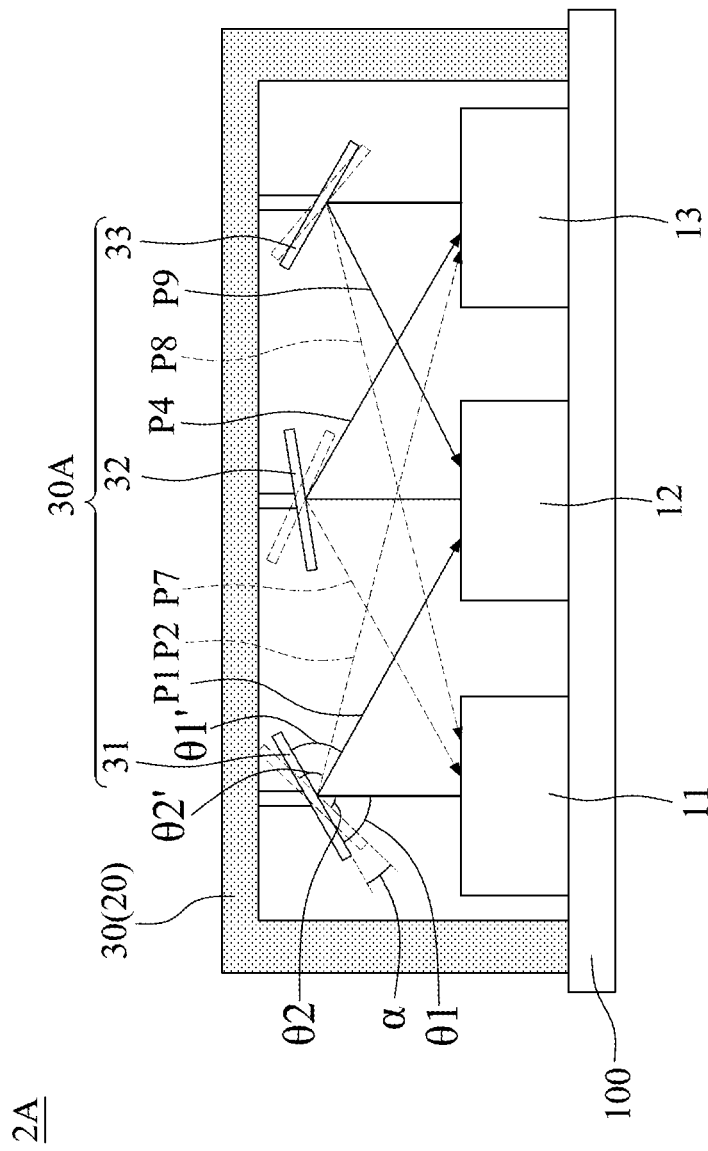
FIG. 2A is a cross-section of an optical package in accordance with some arrangements of the present disclosure.

FIG. 2A is a cross-section of an optical package 2A in accordance with some arrangements of the present disclosure. The optical package 2A is similar to the optical package 1 in FIG. 1, and the differences therebetween are described as follows.

In some arrangements, the optical guiding structure 20 includes a reflective structure 30, and the reflective structure 30 includes a lens array 30A. In some arrangements, the lens array 30A is configured to alter one or more reflective angles of one or more optical signals from one or more optical devices 11, 12, and 13.

In some arrangements, the lens array 30A includes one or more lenses 31, 32, and 33. In some arrangements, the optical guiding structure 20 further includes a control unit (not shown) configured to control or adjust a movement or a rotation of the lens 31. In some arrangements, the optical guiding structure 20 further includes a control unit (not shown) configured to adjust an optical path of an output optical signal from the optical device 11 between locations of paths P1 and P2. In some arrangements, the optical guiding structure 20 further includes a control unit (not shown) configured to control or adjust a movement or a rotation of the lens 31 to adjust a reflective angle of an optical signal from the optical device 11. In some arrangements, the optical guiding structure 20 further includes a control unit (not shown) configured to control or adjust a movement or a rotation of the lens 31 to adjust or alter an optical path to optically couple the optical device 11 with the optical device 12 or the optical device 13. In some arrangements, the emitting angle of the optical signal from the optical device 11 remains substantially constant, and the lens 31 is configured to adjust the optical transmission path of the optical signal from the optical device 11.

Similarly, the control unit (not shown) of the optical guiding structure 20 may be configured to control or adjust a movement or a rotation of the lens 32 and a movement or a rotation of the lens 33. In some arrangements, the control unit (not shown) of the optical guiding structure 20 may be configured to adjust an optical path of an output optical signal from the optical device 12 between locations of paths P4 and P7, and an optical path of an output optical signal from the optical device 13 between locations of paths P8 and P9. In some arrangements, the control unit (not shown) of the optical guiding structure 20 may be configured to control or adjust a movement or a rotation of the lens 32 to adjust a reflective angle of an optical signal from the optical device 12, and a movement or a rotation of the lens 33 to adjust a reflective angle of an optical signal from the optical device 13. In some arrangements, the control unit (not shown) of the optical guiding structure 20 may be configured to adjust a movement or a rotation of the lens 32 to adjust or alter an optical path to optically couple the optical device 12 with the optical device 11 or the optical device 13, and a movement or a rotation of the lens 33 to adjust or alter an optical path to optically couple the optical device 13 with the optical device 11 or the optical device 12. In some arrangements, the emitting angle of the optical signal from the optical device 12 remains substantially constant, and the lens 32 is configured to adjust the optical transmission path of the optical signal from the optical device 12. In some arrangements, the emitting angle of the optical signal from the optical device 13 remains substantially constant, and the lens 33 is configured to adjust the optical transmission path of the optical signal from the optical device 13.

In some arrangements, the lens array 30A has at least one reflective surface (also referred to as "optical reflective surface") facing the optical devices 11, 12, and 13. In some arrangements, each of the lenses 31, 32, and 33 has a reflective surface (or the optical reflective surface) facing each of the optical devices 11, 12, and 13. In some embodiments, the reflective surfaces of the lenses 31, 32, and 33 are substantially flat reflective surfaces. In some arrangements, the reflective surface (or the optical reflective surface) of the lens array 30A is configured to transmit optical signals (also referred to as "a first optical signal and a second optical signal") to at least two optical devices (e.g., at least two of the optical devices 11, 12, and 13). For example, the reflective surface of the lens 31 may be configured to transmit a first optical signal to the device 12 and a second optical signal to the device 13. In some arrangements, the reflective surface of the lens 31 is substantially parallel to one or more of the optical emitting surfaces 11*a*, 12*a*, and 13*a*, of the optical devices 11, 12, and 13. In some arrangements, the reflective surface of the lens 31 is configured to reflect optical signals toward different directions. In some arrangements, the reflective surface of the lens 31 is configured to alter a propagating direction of light (also referred to as "an optical propagating direction") to transmit the optical signals to two or more of the optical devices 11, 12, and 13 through the air space S1. In some arrangements, the reflective surface of the lens 31 is configured to reflect optical signals toward different locations in the air space S1.

In some arrangements, the reflective surface of the lens array 30A and at least one of the optical devices 11, 12, and 13 are configured to collaboratively adjust an optical transmission angle (e.g., angles θ1, θ2, θ1', and θ2') with respect to the reflective surface of the lens array 30A. In some embodiments, the optical transmission angle (e.g., angles θ1 and θ2) is defined by the reflective surface of the lens array 30A and an optical signal transmitted toward the reflective surface. In some embodiments, the optical transmission angle (e.g., angles θ1' and θ2') is defined by the reflective surface of the lens array 30A and an optical signal reflected by the reflective surface. For example, the reflective surface of the lens 31 and the optical device 11 may be configured to collaboratively adjust an optical transmission angle between θ1 and θ2 so as to transmit an optical signal to the optical device 12 or the optical device 13. For example, the reflective surface of the lens 31 and the optical device 11 may be configured to collaboratively adjust an optical transmission angle between θ1' and θ2' so as to transmit an optical signal to the optical device 12 or the optical device 13. For example, the reflective surface of the lens 31 and the optical device 11 may be configured to collaboratively adjust an optical transmission angle between θ1 and θ2 so as to transmit an optical signal through the path P1 or the path P2. For example, the reflective surface of the lens 31 and the optical device 11 may be configured to collaboratively adjust an optical transmission angle between θ1' and θ2' so as to transmit an optical signal through the path P1 or the path P2. In some arrangements, the lens 31 may be rotated by an angle α to adjust an optical transmission angle between θ1 and θ2 so as to transmit an optical signal from the optical device 11 to the optical device 12 or the optical device 13. In some arrangements, the angle θ1 is substantially equal to the angle θ1'. In some arrangements, the angle θ2 is substantially equal to the angle θ2'. In some arrangements, the control unit (not shown) of the optical guiding structure 20 may be configured to control or adjust the angle α by which the lens 31 rotates.

Similarly, the reflective surface of the lens 32 and the optical device 12 may be configured to collaboratively adjust an optical transmission angle with respect to the reflective surface of the lens 32. For example, the reflective surface of the lens 32 and the optical device 12 may be configured to collaboratively adjust an optical transmission angle so as to transmit an optical signal to the optical device 11 or the optical device 13. For example, the reflective surface of the lens 32 and the optical device 12 may be configured to collaboratively adjust an optical transmission angle so as to transmit an optical signal through the path P4 or the path P7. Similarly, the reflective surface of the lens 33 and the optical device 13 may be configured to collaboratively adjust an optical transmission angle with respect to the reflective surface of the lens 33. For example, the reflective surface of the lens 33 and the optical device 13 may be configured to collaboratively adjust an optical transmission angle so as to transmit an optical signal to the optical device 11 or the optical device 12. For example, the reflective surface of the lens 33 and the optical device 13 may be configured to collaboratively adjust an optical transmission angle so as to transmit an optical signal through the path P8 or the path P9.

Figure 2B:
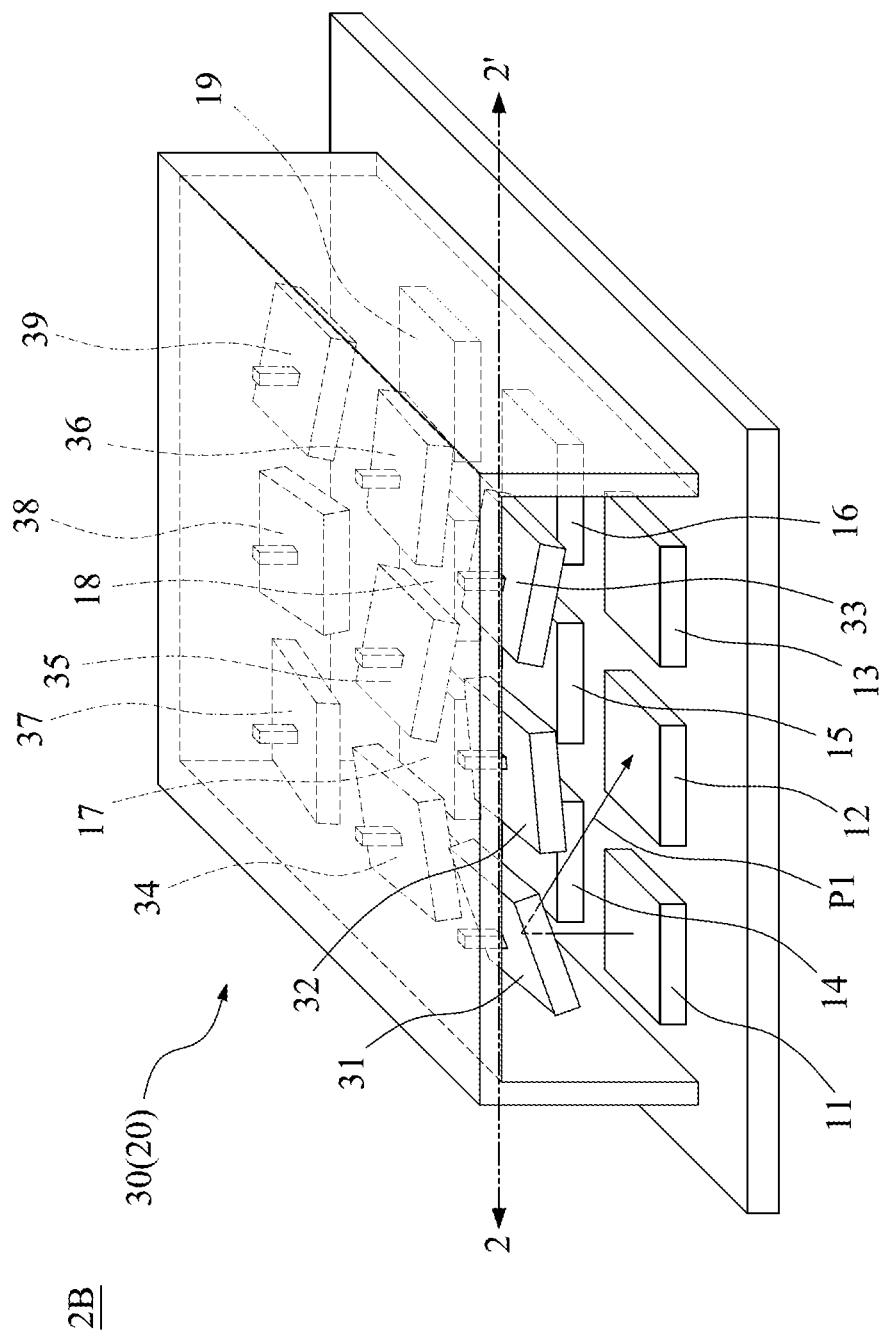
FIG. 2B is a perspective view of an optical package in accordance with some arrangements of the present disclosure.

FIG. 2B is a perspective view of an optical package 2B in accordance with some arrangements of the present disclosure. In some arrangements, FIG. 2B illustrates a cross-section along a line 2-2' in FIG. 2A. Please be noted that some components/elements are omitted in FIG. 2B for clarity.

In some arrangements, the optical package 2B includes optical devices 11, 12, 13, 14, 15, 16, 17, 18, and 19. In some arrangements, the lens array 30A includes lens 31, 32, 33, 34, 35, 36, 37, 38, and 39. In some arrangements, each of the lens is disposed directly above a corresponding optical device. In some arrangements, an area of each of the lens is equal to, less than, or greater than an area of the corresponding optical device. In some arrangements, the lens array 30A is a 3×3 lens array. However, the number of the lenses of the lens array 30A is not limited thereto and may vary according to actual applications.

Figure 3A:
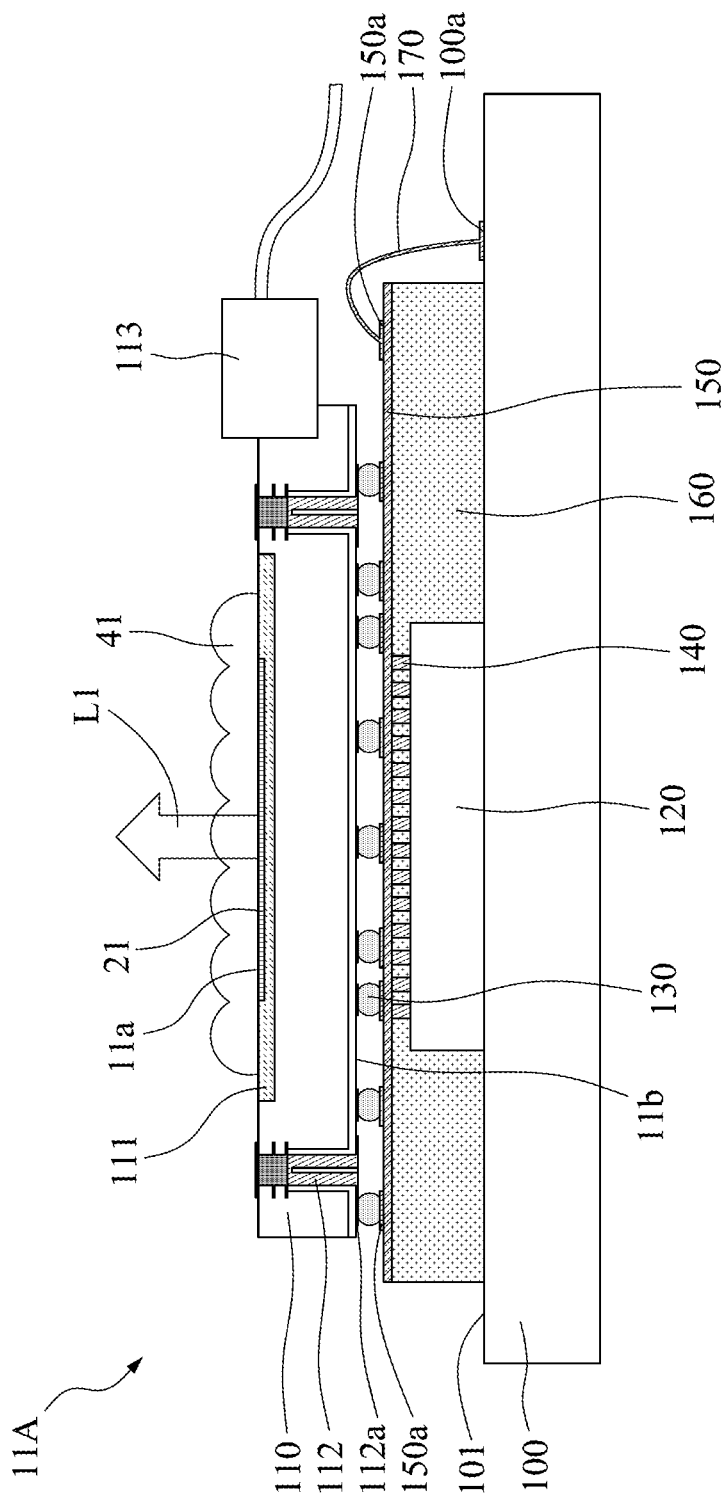
FIG. 3A is a cross-section of an optical device of an optical package in accordance with some arrangements of the present disclosure.

FIG. 3A is a cross-section of an optical device 11A of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 3A.

In some arrangements, the optical device 11A is disposed over a surface 101 of the carrier 100. In some arrangements, the optical device 11A is disposed over the carrier 100 and includes a circuit layer 111 (also referred to as "an active layer"), one or more conductive vias 112, and an optical source 113. The circuit layer 111 may include an optical guiding component 21 adjacent to an optical emitting surface 11*a* of the optical device 11A. The conductive via 112 may be within the optical device 11A and configured to electrically connect to the circuit layer 111. The optical source 113 may be optically coupled with the optical guiding component 21. In some arrangements, the optical source 113 includes an optical fiber array component. In some arrangements, the optical fiber array component includes an integrated component including a plurality of fiber array units (FAUs).

In some arrangements, the optical guiding component 21 is configured to change a phase of an optical signal L1 transmitted through an optical transmission path of the optical device 11A. In some arrangements, the optical guiding component 21 is configured to steer a direction of an optical signal L1 input to or output from the optical device 11A. In some arrangements, the optical guiding component 21 is configured to alter a propagation direction of an optical signal L1 transmitted through an optical transmission path of the optical device 11A.

In some arrangements, the optical device 11A includes a photonic component 110, an electronic component 120, connection elements 130, conductive elements 140, a redistribution layer (RDL) 150, an encapsulant 160, and a conductive wire 170. In some arrangements, the electronic component 120 is electrically connected to the photonic component 110. The photonic component 110 may be or include a photonic IC (PIC). The electronic component 120 may be or include an electronic IC (EIC).

In some arrangements, the photonic component 110 includes the circuit layer 111 and the conductive vias 112. The photonic component 110 may have a recess adjacent to the optical emitting surface 11a and configured to accommodate the optical source 113. The photonic component 110 has an optical emitting surface 11a and a surface 11b opposite to the optical emitting surface 11a. In some arrangements, the optical emitting surface 11a is an active surface of the photonic component 110, and the surface 11b is a passive surface opposite to the active surface (i.e., the optical emitting surface 11a). The photonic component 110 may be electrically connected to the electronic component 120 through the connection elements 130. The connection elements 130 may be or include conductive bumps, solder balls, or the like. In some arrangements, the connection element 130 is electrically connected to a conductive pad 150a of the RDL 150. In some arrangements, the connection element 130 is electrically connected to a conductive pad 112a that electrically connects to the conductive via 112. In some arrangements, the circuit layer 111 received electrical signals from the electronic component 120 through the conductive via 112 instead of a conductive wire, and thus the signal transmission path is reduced.

In some arrangements, the electronic component 120 is adhered or attached to the surface 101 of the carrier 100 through an adhesive layer, e.g., a die attached film (DAF) (not shown in FIG. 3A). In some arrangements, the electronic component 120 is electrically connected to the photonic component 110 through the conductive elements 140 and the RDL 150. The conductive elements 140 may be or include conductive pads, conductive studs, conductive pillars, conductive vias, or the like. In some arrangements, the encapsulant 160 encapsulates the electronic component 120 and the conductive elements 140. The electronic component 120 is electrically connected to the carrier 100 through the conductive wire 170. The conductive wire 170 may electrically connect to the electronic component 120 through a conductive pad 150a of the RDL 150, and the conductive wire 170 may electrically connect to the carrier 100 through a conductive pad 100a of the carrier 100.

Figure 3B:
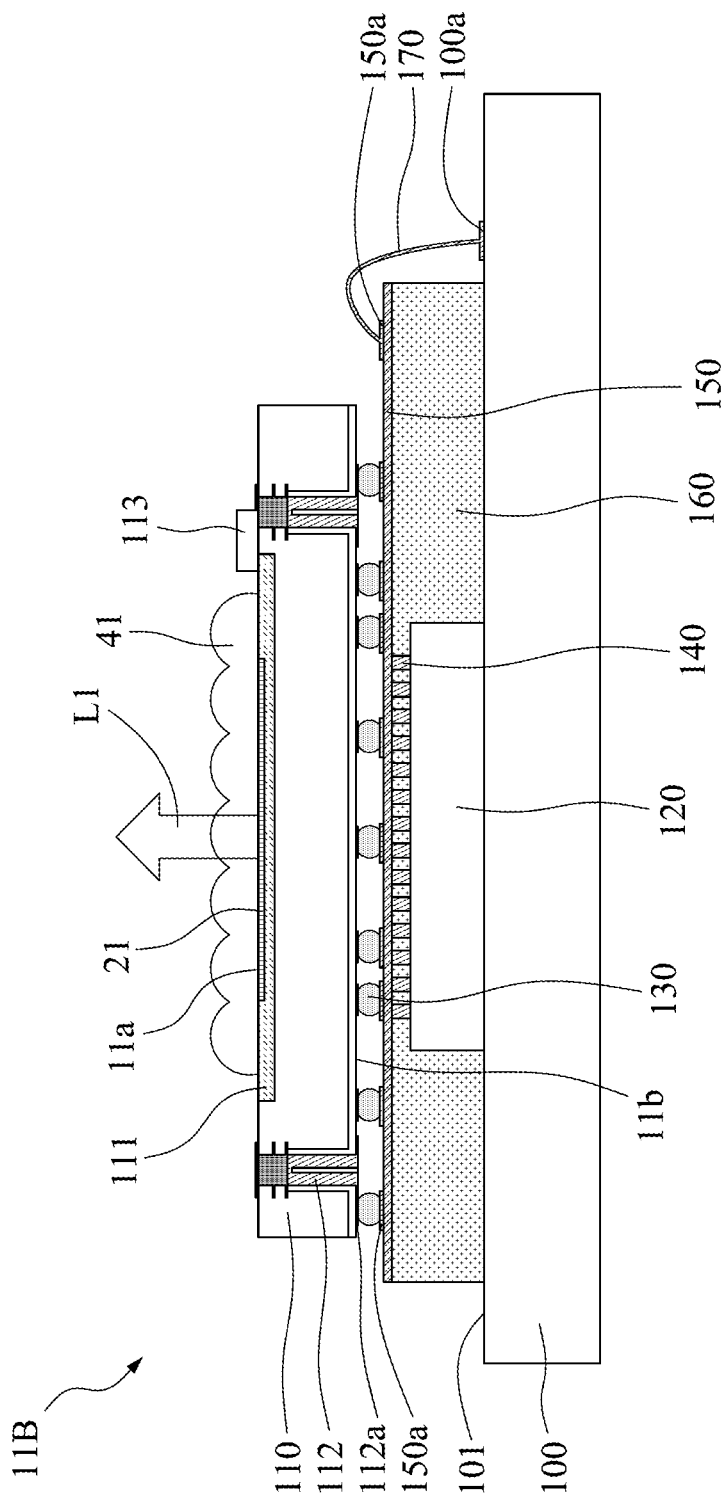
FIG. 3B is a cross-section of an optical device of an optical package in accordance with some arrangements of the present disclosure.

FIG. 3B is a cross-section of an optical device 11B of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 3B. The optical device 11B is similar to the optical device 11A in FIG. 3A, and the differences therebetween are described as follows.

In some arrangements, the optical source 113 may be or include an optical emitting element, e.g., a laser diode. In some arrangements, the optical source 113 may be optically coupled to the optical guiding component 21.

Figure 3C:
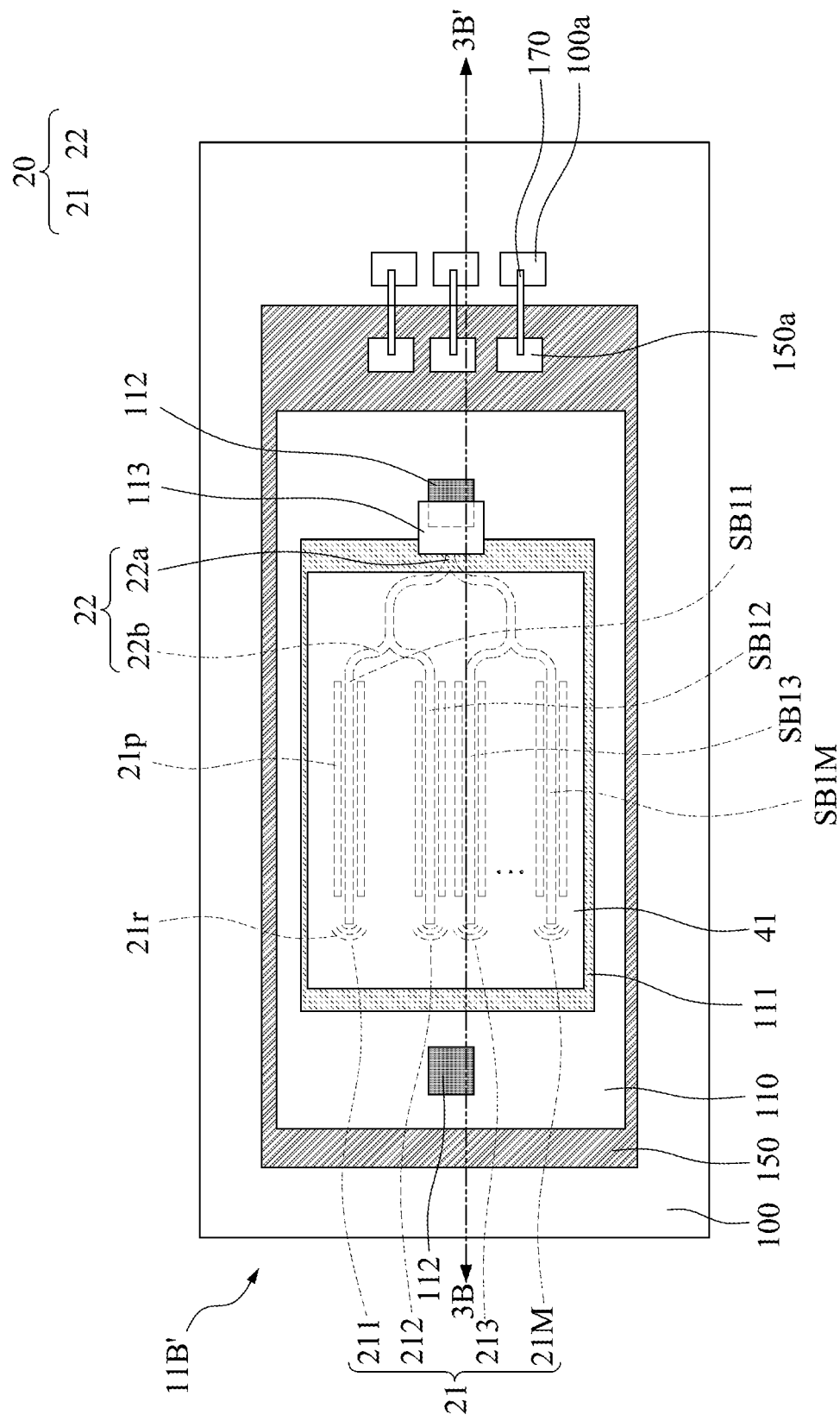
FIG. 3C is a top view of an optical device of an optical package in accordance with some arrangements of the present disclosure.

FIG. 3C is a top view of an optical device 11B' of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 3C. In some arrangements, FIG. 3C illustrates a cross-section along a line 3B-B' in FIG. 3C. Please be noted that some components/elements are omitted in FIG. 3C for clarity.

In some arrangements, the optical guiding structure 20 includes an optical guiding component 21 and a waveguide 22. In some arrangements, the optical guiding component 21 may be or include an optical phase array (OPA).

As shown in FIG. 3C, the waveguide 22 may be disposed between the optical source 113 and the optical guiding component 21. The waveguide 22 may be configured to transmit an input optical signal. The waveguide 22 may include a portion (or a first portion) 22a optically coupled to the optical source 113 and a portion 22b (or a second portion) optically coupled with the optical guiding component 21. The portion 22a may be connected to the portion 22b. The portion 22a may include a Y-branch waveguide that splits the input optical signal into a plurality of sub-beams. The portion 22b may include a plurality of Y-branch waveguides that receive the sub-beams from the portion 22a and split them into a plurality of sub-beams SB11, SB12, SB13 . . . , and SB1M, wherein M can be an integer. The waveguide 22 as illustrated in FIG. 3C is an example only. The waveguide 22 may include more portions than the portions 22a and 22b. The waveguide 22 may include other types of splitters, for example, a directional splitter, a multimode interference splitter, or the like. In some arrangements, the waveguide 22 may be configured to transmit the sub-beams SB11, SB12, SB13 . . . , and SB1M. The waveguide 22 may be made of one or more dielectric materials or any other optically conductive materials.

As shown in FIG. 3C, the optical guiding component 21 may be disposed within or integrated in the circuit layer 111. The optical guiding component 21 may include a plurality of unit cells 211, 212, 213 . . . , and 21M. The unit cells 211, 212, 213 . . . , and 21M may be optically coupled to the portion 22b of the waveguide 22. Each of the unit cells 211, 212, 213 . . . , and 21M may be configured to respectively receive the sub-beams SB11, SB12, SB13 . . . , and SB1M. Each of the unit cells may allow a sub-beam to propagate therethrough. The optical guiding component 21 as illustrated in FIG. 3C is an example only. The optical guiding component 21 may include 64*64 unit cells in an array or another configuration. The lens element 41 may include a lens covering the unit cells of the optical guiding component 21. The lens element 41 may include a plurality of lenses each covering a respective unit cell or several unit cells of the optical guiding component 21.

Each of the unit cells 211, 212, 213 . . . , and 21M may include a phase shifter 21p and a radiator 21r (or an antenna element, or a grating portion). Each of the phase shifters 161p may be configured to alter (or adjust, control) the phase of the corresponding sub-beam (e.g., one of the sub-beams SB11, SB12, SB13 . . . , and SB1M) of the input optical signal. In some arrangements, the phase shifters 21p may be configured to induce a thermo-optic phase shift on the phase of the sub-beams SB11, SB12, SB13 . . . , and SB1M. The phase shifters 21p may be thermo-optic phase shifters. The phase shifters 21p may be configured to induce an electro-optic phase shift on the phase of the sub-beams SB11, SB12, SB13 . . . , and SB1M. The phase shifters 21p may be electro-optic phase shifters. In some arrangements, the phase shifters 21p may adjust the refractive indexes of the unit cells (e.g., waveguides).

The radiators 21r may be configured to generate the sub-beams SB11, SB12, SB13 . . . , and SB1M from the input optical signal. In some arrangements, the radiators 21r may be configured to output a plurality of wavefronts based on the sub-beams SB11, SB12, SB13 . . . , and SB1M. The wavefronts may interfere with each other through multiple slit diffraction. In some arrangements, the sub-beams SB11, SB12, SB13 . . . , and SB1M generated by the optical guiding component 21 may form a beam (or an output optical signal) through multiple slit diffraction. By adjusting or controlling the phase of the sub-beams SB11, SB12, SB13 . . . , and SB1M of the input optical signal, the direction or intensity of the beam (or the output optical signal) can be adjusted or controlled. In other words, by dynamically controlling the optical properties of the sub-beams SB11, SB12, SB13 . . . , and SB1M of the input optical signal, the optical guiding component 21 may be configured to steer the direction of the beam (or the output optical signal). In some arrangements, the optical guiding component 21 may be configured to alter a wavefront of the input optical signal. The beam (or the output optical signal) may be deflected from a propagation direction of the input optical signal.

Referring to FIGS. 3B and 3C, the optical guiding component 21 may steer the beam (or the optical signal L1) by controlling the phase of the sub-beams SB11, SB12, SB13 . . . , and SB1M of the input optical signal. The optical guiding component 21 may be configured to consecutively adjust the direction of the beam (or the optical signal L1). The beam (or the optical signal L1) may be emitted by the optical guiding component 21 in different directions at respective time intervals.

Figure 4A:
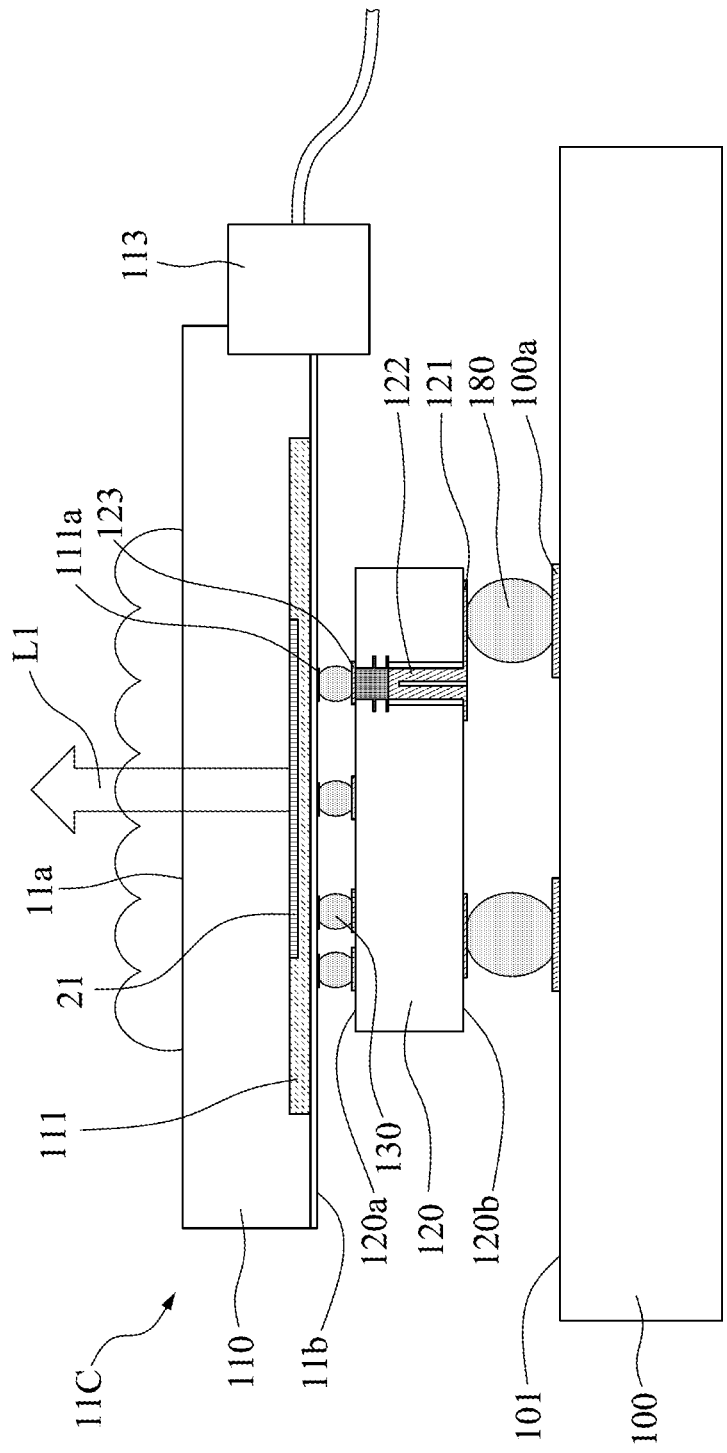
FIG. 4A is a cross-section of an optical device of an optical package in accordance with some arrangements of the present disclosure.

FIG. 4A is a cross-section of an optical device 11C of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 4A. The optical device 11C is similar to the optical device 11A in FIG. 3A, and the differences therebetween are described as follows.

In some arrangements, the first optical device 11C has an optical emitting surface 11a and a surface 11b opposite to the optical emitting surface 11a, and the surface 11b is an active surface of the photonic component 110. In some arrangements, the lens element 41 is disposed closer to the optical emitting surface 11a than to the active surface (i.e., the surface 11b).

In some arrangements, the electronic component 120 has an active surface 120b and a passive surface 120a opposite to the active surface 120b, and the electronic component 120 includes a conductive via 122 electrically connecting the connection elements 130 to the active surface 120b. In some arrangements, the connection element 130 is electrically connected to a conductive pad 111a that electrically connects to the circuit layer 111. In some arrangements, the connection element 130 is electrically connected to the conductive via 122 through a conductive pad 123. In some arrangements, the electronic component 120 is electrically connected to the carrier 100 through connection elements 180. In some arrangements, the connection element 180 electrically connects a conductive pad 121 that electrically connects to the conductive via 122 of the electronic component 120 to a conductive pad 100a of the carrier 100. In some arrangements, the optical source 113 includes an optical fiber array component. In some arrangements, the optical fiber array component includes an integrated component including a plurality of fiber array units (FAUs). With the design of the conductive via 122 within the electronic component 120, tall pillars that electrically connect the electronic component 120 to the carrier 100 are not required, and an encapsulant encapsulating the tall pillars are not required either. Therefore, the overall structure of the package is simplified, and the manufacturing process is simplified as well.

Figure 4B:
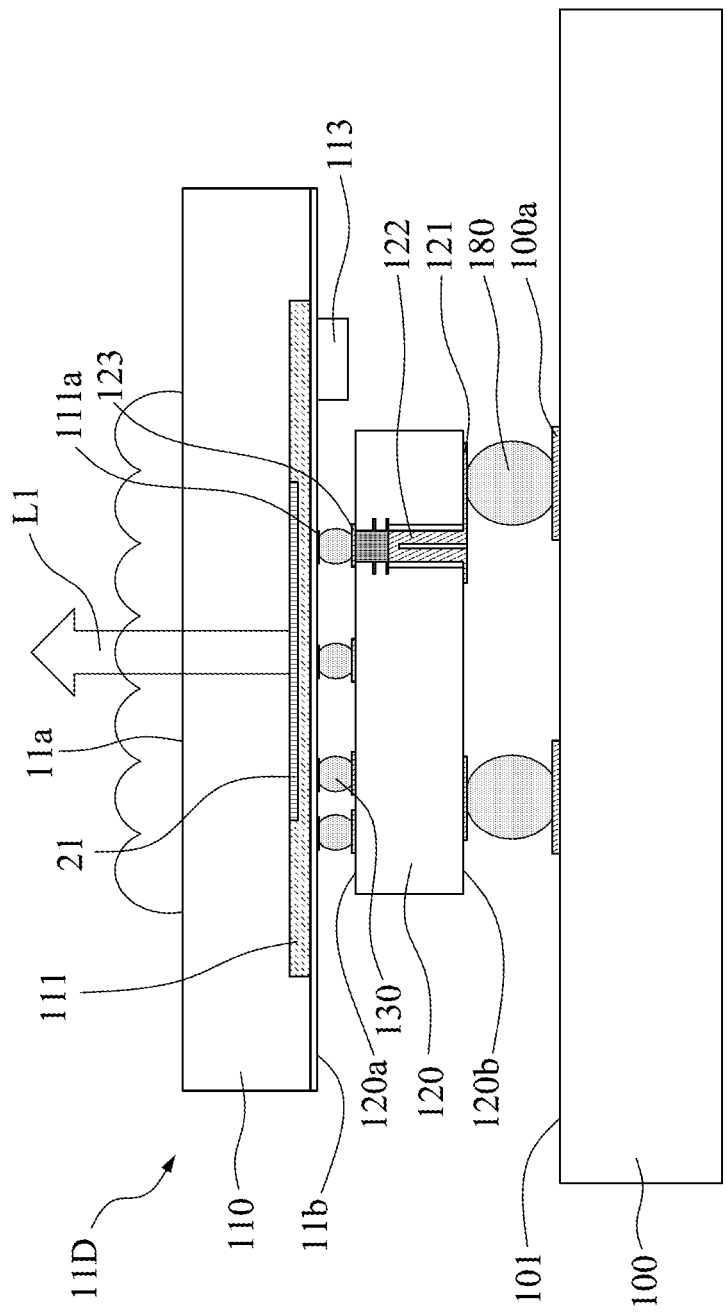
FIG. 4B is a cross-section of an optical device of an optical package in accordance with some arrangements of the present disclosure.

FIG. 4B is a cross-section of an optical device 11D of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 4B. The optical device 11D is similar to the optical device 11C in FIG. 4A, and the differences therebetween is that the optical source 113 may be or include an optical emitting element, e.g., a laser diode.

Figure 5A:
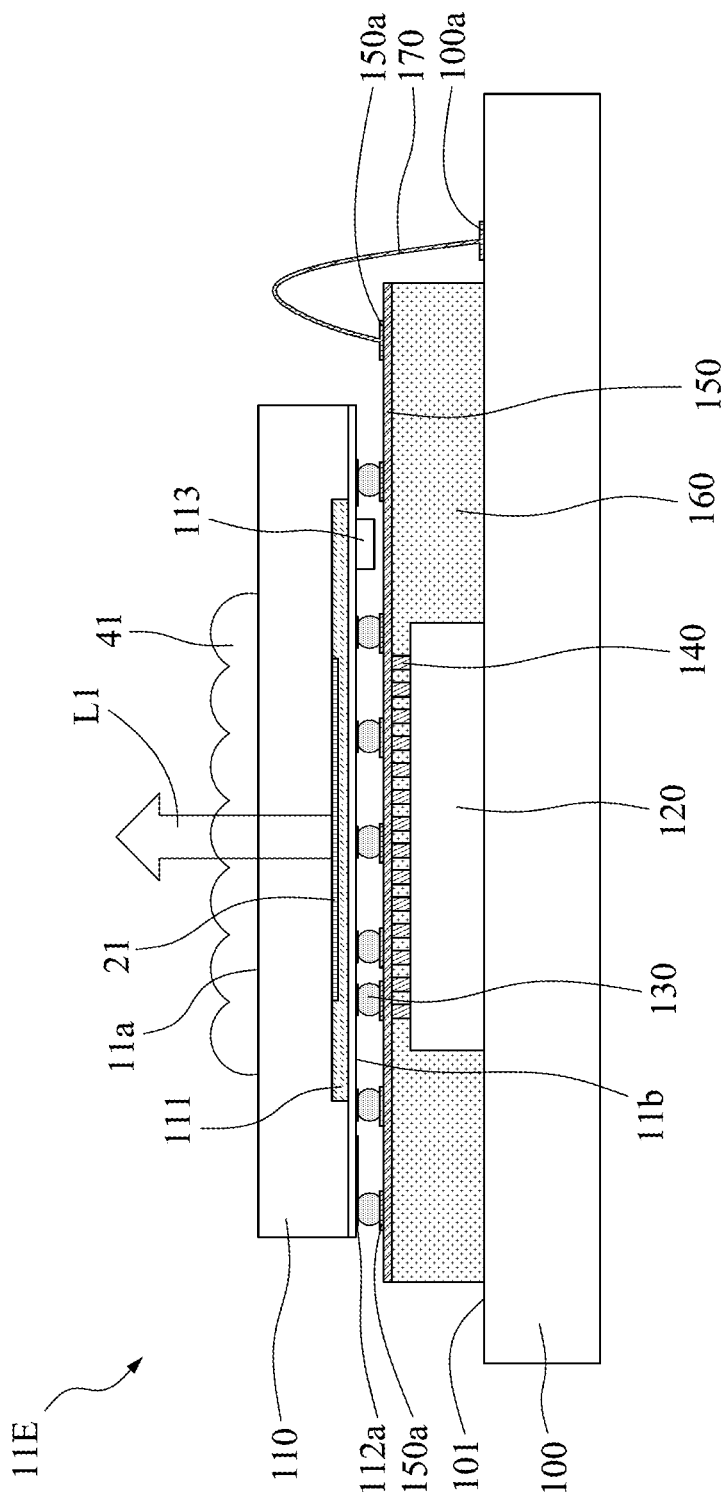
FIG. 5A is a cross-section of an optical device of an optical package in accordance with some arrangements of the present disclosure.

FIG. 5A is a cross-section of an optical device 11E of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 5A. The optical device 11E is similar to the optical device 11A in FIG. 3A, and the differences therebetween are described as follows.

In some arrangements, the photonic component 110 has an optical emitting surface 11a and an active surface (i.e., the surface 11b) opposite to the optical emitting surface 11a. In some arrangements, the optical emitting surface 11a is a passive surface of the photonic component 110.

Figure 5B:
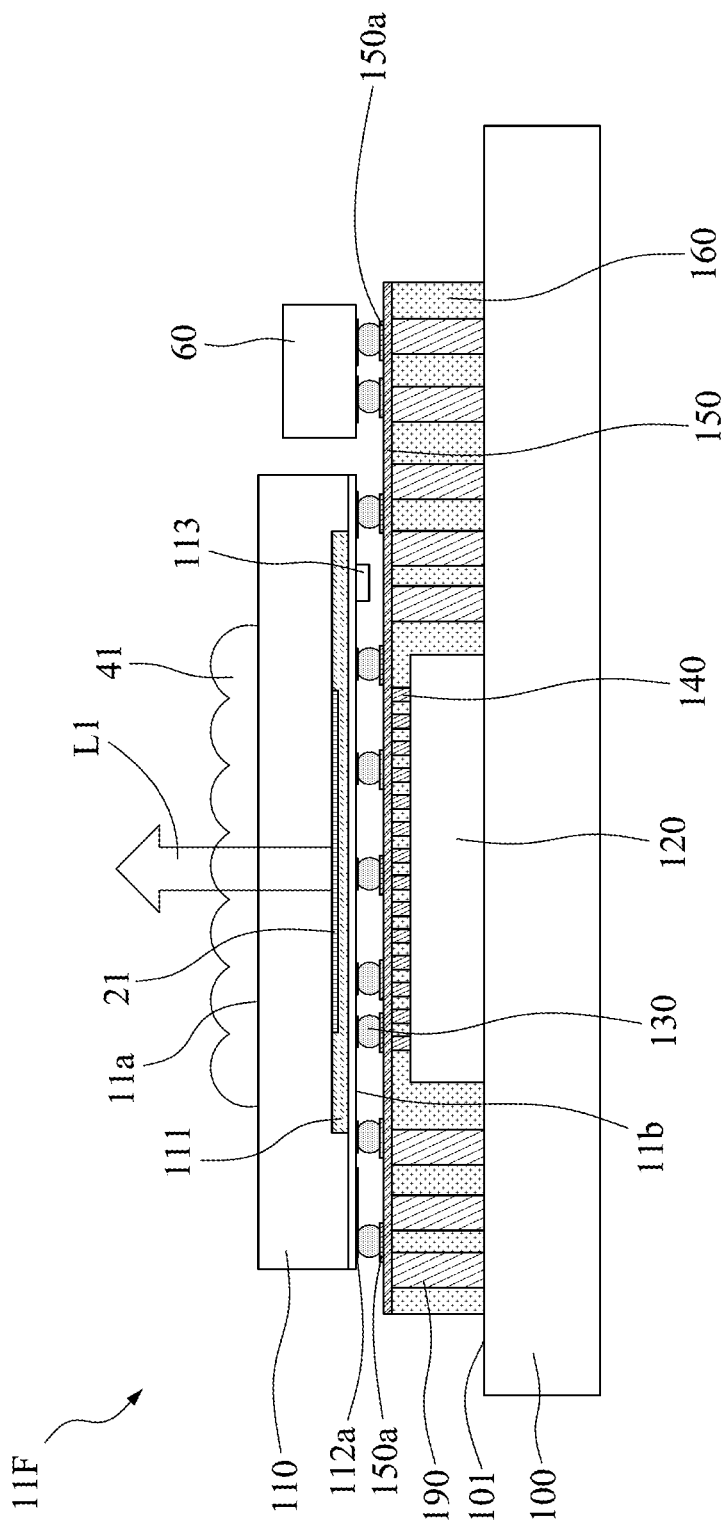
FIG. 5B is a cross-section of an optical device of an optical package in accordance with some arrangements of the present disclosure.

FIG. 5B is a cross-section of an optical device 11F of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 5B. The optical device 11F is similar to the optical device 11A in FIG. 3A, and the differences therebetween are described as follows.

In some arrangements, the optical package further includes a processing component 60 and one or more conductive structures 190. In some arrangements, the processing component 60 is integrated with the optical device 11F. In some arrangements, the conductive structures 190 electrically connect the carrier 100 to the RDL 150. In some arrangements, the conductive structures 190 are encapsulated by the encapsulant 160. The conductive structures 190 may be or include conductive pillars. In some arrangements, electrical signals transmitted between the RDL 150 and the carrier 100 is achieved by the conductive structure 190 rather than by a conductive wire, the transmission path is recued, and thus the transmission speed can be increased significantly, which is advantageous to high speed transmission applications.

In some arrangements, the photonic component 110 is integrated with the optical guiding component 21, and the electronic component 120 is stacked between the carrier 100 and the photonic component 110. In some arrangements, the processing component 60 is electrically connected to the electronic component 120 through the connection elements 130, the RDL 150, and the conductive elements 140. In some arrangements, the processing component 60 is electrically connected to the carrier 100 through the connection elements 130, the RDL 150, and the conductive structures 190.

Figure 5C:
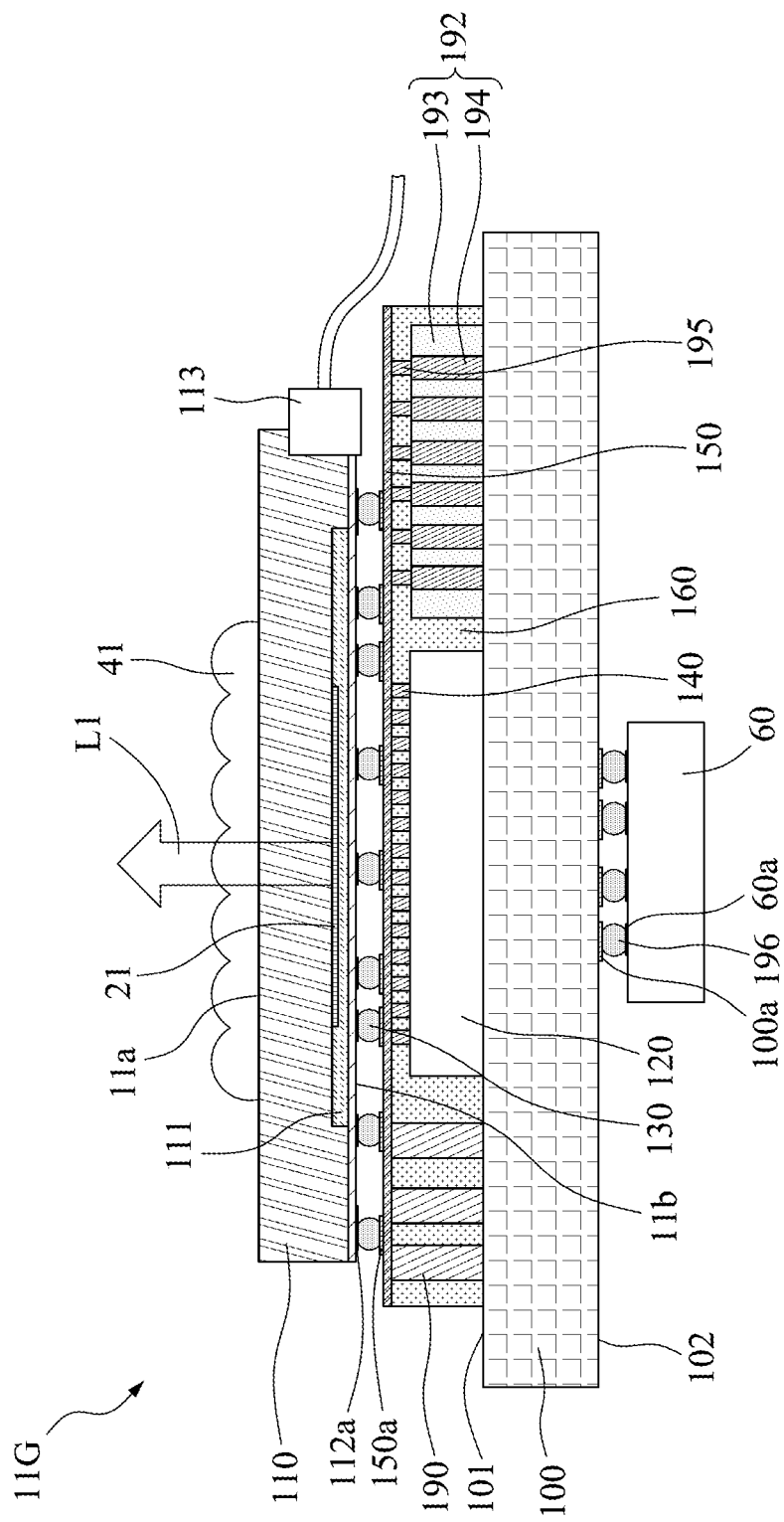
FIG. 5C is a cross-section of an optical device of an optical package in accordance with some arrangements of the present disclosure.

FIG. 5C is a cross-section of an optical device 11G of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 5C. The optical device 11G is similar to the optical device 11A in FIG. 3A, and the differences therebetween are described as follows.

In some arrangements, the optical package further includes a connection element 192 and conductive element 195 encapsulated by the encapsulant 160. In some arrangements, the connection element 192 electrically connects the carrier 100 to the RDL 150. In some arrangements, the connection element 192 includes one or more conductive structures 194 (or conductive pillars) and an encapsulant 193 encapsulating the conductive structures 194. In some arrangements, the carrier 100 is electrically connected to the RDL 150 through the conductive structures 194 and the conductive elements 195. The connection element 192 may be or include a dummy die. The conductive elements 195 may be or include conductive pads, conductive studs, conductive pillars, conductive vias, or the like.

In some arrangements, the processing component 60 is disposed over a side of the carrier 100 opposite to the optical device 11G. In some arrangements, the carrier 100 has a surface 101 and a surface 102 opposite to the surface 101, the optical device 11G is disposed over the surface 101, and the processing component 60 is disposed over the surface 102. In some arrangements, the processing component 60 is electrically connected to the carrier 100 through connection elements 196. The connection elements 196 may be or include conductive bumps, solder balls, or the like. In some arrangements, the connection element 196 is electrically connected to a conductive pad 100a of the carrier 100, and the connection element 196 is electrically connected to a conductive pad 60a of the processing component 60.

Figure 6A:
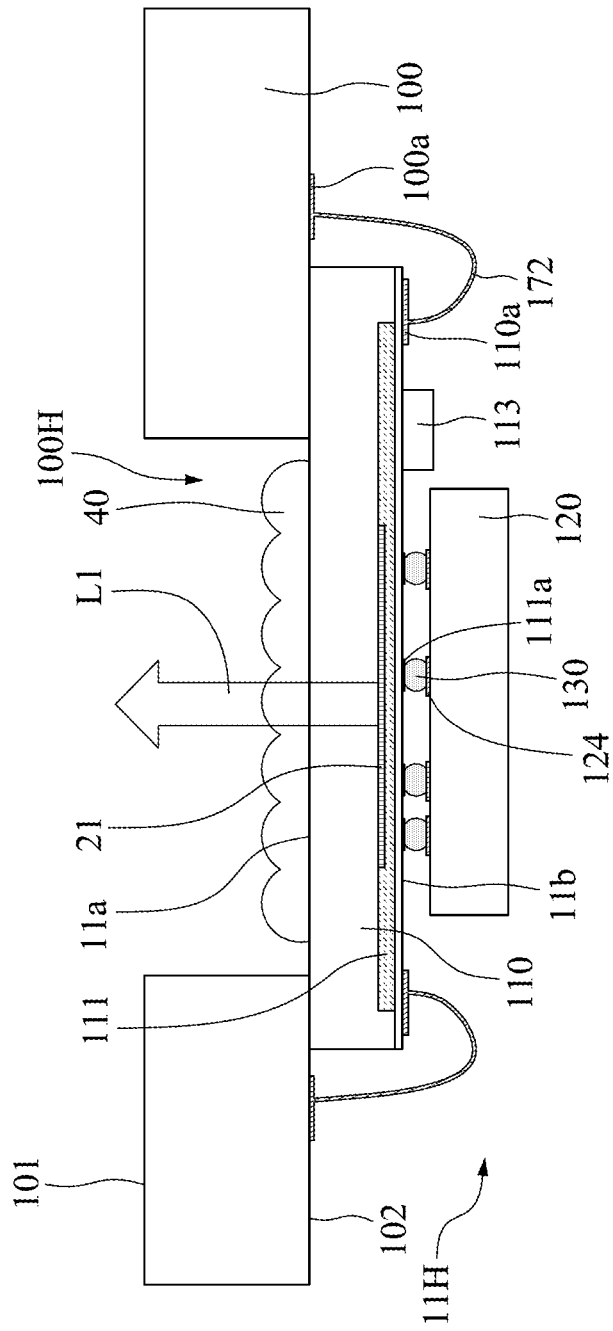
FIG. 6A is a cross-section of an optical device of an optical package in accordance with some arrangements of the present disclosure.

FIG. 6A is a cross-section of an optical device 11H of an optical package in accordance with some arrangements of the present disclosure. The optical device 11H is similar to the optical device 11A in FIG. 3A, and the differences therebetween are described as follows. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 6A.

In some arrangements, the carrier 100 has an opening 100H (also referred to as "a through hole"). In some arrangements, the opening 100H penetrates the carrier 100 between the surface 101 and the surface 102. In some arrangements, the optical device 11H is adhered to the surface 102, and a portion of the optical device 11H is exposed from the opening 100H of the carrier 100. The optical device 11H may be adhered to the surface 102 of the carrier 100 through an adhesive layer (not shown in FIG. 6A). In some arrangements, the optical device 11H is electrically connected to the carrier 100 through a conductive wire 172. In some arrangements, a conductive pad 110a of the photonic component 110 is electrically connected to a conducive pad 100a of the carrier 100 through the conductive wire 172.

In some arrangements, the lens element 40 is disposed on the optical emitting surface 11a of the optical device 11H and within the opening 100H of the carrier 100. In some arrangements, the lens element 40 directly contacts the optical emitting surface 11a of the optical device 11H. In some arrangements, the electronic component 120 is electrically connected to the photonic component 110 through one or more conductive pads 124 of the electronic component 120, one or more connection elements 130, and one or more conductive pads 111a of the photonic component 110.

Figure 6B:
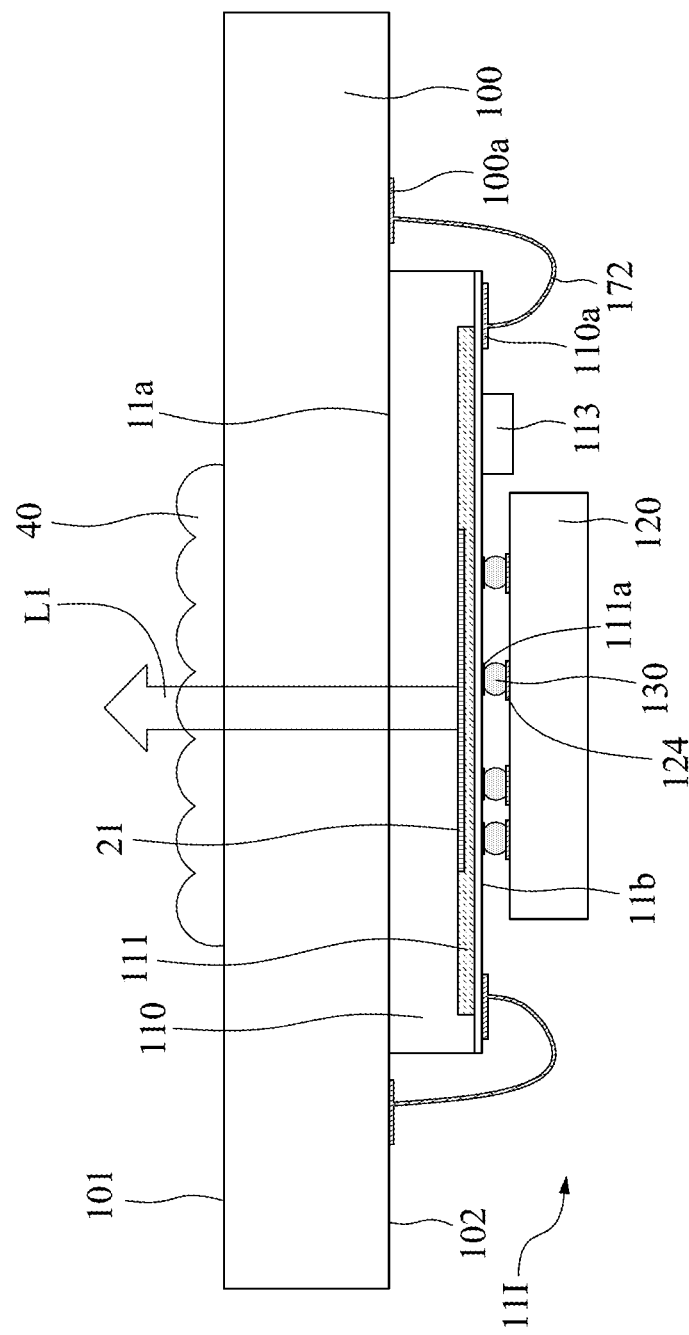
FIG. 6B is a cross-section of an optical device of an optical package in accordance with some arrangements of the present disclosure.

FIG. 6B is a cross-section of an optical device 11I of an optical package in accordance with some arrangements of the present disclosure. In some arrangements, one or more of the optical devices 11, 12, 13, 14, 15, 16, 17, 18, 19, 11', 12', 13', 14', 15', 16', 17', and 18' described above may have a structure similar to or the same as the structure illustrated in FIG. 6B. The optical device 11I is similar to the optical device 11G in FIG. 6A, and the differences therebetween are described as follows.

In some arrangements, the optical device 11I and the lens element 40 are disposed on opposite sides of the carrier 100. In some arrangements, the lens element 40 is disposed over the surface 101, and the optical device 11I is disposed over the surface 102. In some arrangements, the carrier 100 is configured to allow the optical signal L1 to transmit therethrough so as to reach the lens element 40. In some arrangements, the optical device 11I is adhered to the surface 102 of the carrier 100 through a transparent adhesive layer (not shown in FIG. 6B). In some arrangements, the lens element 40 is directly above the optical guiding component 21.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of said numerical value, such as less than or equal to ±5%, less than or equal to ±4%, less than or equal to ±3%, less than or equal to ±2%, less than or equal to #1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to #1°, less than or equal to ±0.5°, less than or equal to ±0.1°, or less than or equal to =0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some arrangements, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific arrangements thereof, these descriptions and illustrations do not limit the present disclosure. It can be clearly understood by those skilled in the art that various changes may be made, and equivalent components may be substituted within the arrangements without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and the like. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An optical package, comprising:
a first optical device disposed over a carrier;
an optical guiding structure disposed over the carrier and configured to adjust a first optical transmission path of the first optical device; and
a second optical device disposed over the carrier and configured to optically couple with the first optical device through the first optical transmission path.

2. The optical package as claimed in claim 1, wherein the first optical device is configured to emit or receive an optical signal through the first optical transmission path.

3. The optical package as claimed in claim 2, wherein the optical guiding structure is configured to adjust a transmitting direction of the optical signal.

4. The optical package as claimed in claim 1, wherein the optical guiding structure is configured to adjust a second optical transmission path of the second optical device.

5. The optical package as claimed in claim 4, wherein the second optical device is configured to emit or receive an optical signal through the second optical transmission path, and the optical guiding structure is configured to adjust a transmitting direction of the optical signal.

6. The optical package as claimed in claim 1, further comprising a third optical device disposed over the carrier, wherein the optical guiding structure is configured to alter the first optical transmission path to optically couple the first optical device with the second optical device or the third optical device.

7. The optical package as claimed in claim 1, further comprising a third optical device disposed over the carrier, wherein the optical guiding structure is configured to optically couple the first optical device with the second optical device at a first time interval and optically couple the first optical device with the third optical device at a second time interval different from the first time interval.

8. The optical package as claimed in claim 7, wherein the optical guiding structure is configured to adjust the first optical transmission path to a first path region at the first time interval and to a second path region at the second time interval.

9. The optical package as claimed in claim 1, wherein optical emitting surfaces of the first optical device and the second optical device face a same side.

10. The optical package as claimed in claim 9, wherein the optical guiding structure further comprises a reflective structure over the optical emitting surfaces and configured to direct an optical signal from the first optical device to the second optical device through the first optical transmission path.

11. An optical package, comprising:
a first optical device;
a second optical device; and
an optical reflective surface configured to transmit a first optical signal to the first optical device and a second optical signal to the second optical device, wherein the optical reflective surface is substantially parallel to a surface of the first optical device and a surface of the second optical device.

12. The optical package as claimed in claim 11, wherein the optical reflective surface is configured to alter an optical propagating direction to transmit the first optical signal and the second optical signal through an air space.

13. The optical package as claimed in claim 11, further comprising a third optical device optically coupled with the first optical device and the second optical device, wherein the optical reflective surface and the third optical device are configured to collaboratively adjust an optical transmission angle with respect to the optical reflective surface.

14. The optical package as claimed in claim 11, wherein the first optical device and the second optical device are configured to receive the first optical signal and the second optical signal from the optical reflective surface at a same time interval.

15. An optical package, comprising:
a first optical device exposed to an air space;
an optical guiding structure configured to adjust at least one optical path starting from the first optical device and passing through the air space;
a carrier over which the first optical device is disposed, wherein the optical guiding structure comprises a reflective structure over the carrier, and the reflective structure and the carrier collectively define the air space; and
a first processing component over the carrier and electrically connected to the first optical device, wherein the first processing component is disposed in the air space.

16. The optical package as claimed in claim 15, further comprising:
a second optical device exposed to the air space; and
a second processing component over the carrier and electrically connected to the second optical device, wherein the optical guiding structure is configured to optically couple the first optical device with the second optical device through the at least one optical path.

* * * * *